US011585955B2

(12) United States Patent
Stewart

(10) Patent No.: US 11,585,955 B2
(45) Date of Patent: Feb. 21, 2023

(54) SYSTEMS AND METHODS FOR PROBABILISTIC WELL DEPTH PROGNOSIS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 149 days.

(21) Appl. No.: 17/325,942

(22) Filed: May 20, 2021

(65) Prior Publication Data

US 2022/0373702 A1 Nov. 24, 2022

(51) Int. Cl.
*G01V 1/30* (2006.01)
*G06N 20/00* (2019.01)

(52) U.S. Cl.
CPC ............ *G01V 1/301* (2013.01); *G06N 20/00* (2019.01); *E21B 2200/20* (2020.05); *G01V 2210/1295* (2013.01); *G01V 2210/1425* (2013.01); *G01V 2210/642* (2013.01)

(58) Field of Classification Search
None
See application file for complete search history.

(56) References Cited

U.S. PATENT DOCUMENTS

| 10,370,955 B2 | 8/2019 | De Prisco |
| 10,385,678 B2 | 8/2019 | Nguyen |
| 2016/0146973 A1* | 5/2016 | Johnson ................. G01V 1/306 702/2 |
| 2020/0278468 A1* | 9/2020 | Zhang ...................... G01V 1/50 |
| 2021/0110280 A1* | 4/2021 | Akkurt ..................... G01V 5/12 |

FOREIGN PATENT DOCUMENTS

| WO | WO 2010129247 | 11/2010 |
| WO | WO 2013119245 | 8/2013 |

(Continued)

OTHER PUBLICATIONS

Blake, "Quantifying Depth Uncertainty", LinkedIN Pulse Article, Dec. 14, 2016, 7 pages.

(Continued)

*Primary Examiner* — Leon Viet Q Nguyen
(74) *Attorney, Agent, or Firm* — Fish & Richardson P.C.

(57) ABSTRACT

A process for drilling a well into a subsurface formation includes receiving data representing depth maps for a given subsurface region, each depth map being generated from seismic data acquired in a seismic survey at a subsurface region. The process includes determining, for depth maps of the plurality, respective weight values; generating data representing a combination of the depth maps based on the respective weight values; generating a cumulative distribution function (CDF) for a particular location in the subsurface region based on the data representing a combination of the depth maps; determining, based on the CDF for that particular location, a probability value representing a depth at which a geological layer occurs in the subsurface region at the particular location; and drilling the well into the subsurface formation at the particular location to a target depth based on the probability value.

20 Claims, 11 Drawing Sheets

(56) References Cited

FOREIGN PATENT DOCUMENTS

| WO | WO 2016144842 | 9/2016 |
|---|---|---|
| WO | WO 2019243857 | 12/2019 |

OTHER PUBLICATIONS

Dataplot Reference Manual, Weighted Standard Deviation, Sep. 1996, 2 pages.

Dgi.com [online], "A Statistical Approach to Depth Uncertainty Analysis for Model Integrity" Aug. 2020, [retrieved on Jul. 8, 2021], retrieved from: URL <https://www.dgi.com/blog/depth-uncertainty-analysis/>, 8 pages.

Rachmawati, "Critical depth uncertainty analysis for accurate well planning at Tangguh" Proceedings, Indonesian Petroleum Association, IPA17-386-G, May 2017, 11 pages.

Squire et al., "probGRV: a workflow for geostatistical depth conversion and probabilistic assessment of gross rock volume." The APPEA Journal 54.1, 2014, 91-106, 16 pages.

Stamm et al., "Actors, actions, and uncertainties: optimizing decision-making based on 3-D structural geological models" Solid Earth, v. 10, Mar. 2019, 2015-2043, 29 pages.

Thore et al., "Structural uncertainties: Determination, management, and applications" Geophysics, v. 67, May-Jun. 2002, 840-852, 13 pages.

Unger, "Detangling geologic imprints on depth uncertainty: A method for analysing overbuden effects on depth prediction" The Leading Edge, May 2010,. 552-558, 6 pages.

Wellmann & Caumon, "3-D Structural Geological Models: Concepts, Methods, and Uncertainties" Advances in Geophysics, v. 59, Aug. 2019, 95 pages.

Sensia "OFM Brochure: Well and Reservoir Analysis Software" Intelligent Action, 2021, 3 pages.

Zhang, "Pore pressure prediction from well logs: Methods, modifications, and new approaches." Earth-Science Reviews 108.1-2, Sep. 2011, 33 pages.

Zhang et al., "Real-time pore pressure detection: indicators and improved methods." Geofluids, Jan. 2017, 12 pages.

PCT International Search Report and Written Opinion in International Appln. No. PCT/US2022/072466, dated Aug. 29, 2022, 17 pages.

Kristoffersen et al., "An Automatic Well Planner for Efficient Well Placement Optimization under Geological Uncertainty," ECMOR XVII, Sep. 2020, 1-16, 16 pages.

Michelioudakis et al., "Uncertainty analysis of depth predictions from seismic reflection data using Bayesian statistics," Geophysical Journal International, Mar. 2018, 213(3): 2161-2176, 34 pages.

\* cited by examiner

SYSTEMS AND METHODS FOR PROBABILISTIC WELL DEPTH PROGNOSIS

TECHNICAL FIELD

The specification generally relates to oil and gas exploration. More specifically, the specification describes methods and systems related to drilling wells into the deep subsurface and a planning process for vertical or near-vertical wells in situations where multiple depth map realizations give a range of depth forecasts at new well locations.

BACKGROUND

Wells drilled into deep subsurface regions, such as for hydrocarbon production or other purposes, are planned around a forecast (prognosis). The prognosis is a prediction of depths of key geological layers and a depth at which the well ends. The prognosis enables adequate preparation for drilling a new well, such as indicating a correct amount of drilling equipment or well hardware that is needed for the well. For example, well hardware can include well casing tubulars. This hardware is ordered and delivered to the drill site in advance of drilling. The prognosis indicates a chance of success of the well objective in relation to subsurface data such as oil-water contact. For example an oil producer may require a certain vertical distance of standoff above known oil water contact depth. When new wells are drilled, there is uncertainty on the forecast depth of geological layers of interest because the well is drilling a new location and the only information that constrains the depth at this new location is contained in maps that may be made from a variety of indirect techniques. By definition, maps of subsurface geological structure are only correct at the points of existing well penetrations which prove the depth to the layer of interest. In between these points, depth information on the map is either interpolated from the well control points or depth-converted from reflection seismic data that is acquired in the time domain using a velocity model that itself is an approximation. In either case, the mapped information is generally imprecise at the new, undrilled well location. The degree of uncertainty generally increases with distance away from existing wells and also with depth to the layers of interest.

SUMMARY

This specification describes an approach for drilling wells into the deep subsurface, such as vertical or near-vertical wells in situations where multiple depth map realizations give a range of depth forecasts at new well locations. The processes described in the specification utilize statistics derived from multiple map realizations of a given geological layer that could be, for example, an oil or water reservoir. The processes are generally applicable when more than one depth realization is available, which is typical. Different depth conversion algorithms are used to produce alternative realizations of a depth map for a given subsurface region. However, typically, a single realization is chosen as the preferred basis for well planning, rather than a result of a combination of the different depth conversion algorithms.

In a general aspect, a process for drilling a well into a subsurface formation includes performing a seismic survey of the subsurface formation; receiving data representing a plurality of depth maps for a given subsurface region, each depth map of the plurality of depth maps being generated from seismic data acquired in a seismic survey at a location in the subsurface region; determining, for one or more depth maps of the plurality, a respective weight value; generating data representing a combination of the plurality of depth maps based on the respective weight values of the one or more depth maps of the plurality; generating a cumulative distribution function (CDF) for a particular location in the subsurface region based on the data representing a combination of the plurality of depth maps; determining, for the particular location in the subsurface region based on the CDF for that particular location, a probability value describing the likelihood of a depth at which a geological layer occurs in the subsurface region at the particular location; and drilling the well into the subsurface formation at the particular location to a target depth based on the probability value describing a depth at which a geological layer occurs.

In some implementations, the process includes generating, based on the CDF for the well location, a visualization showing, for one or more depth values, an associated probability value.

In some implementations, each depth map of the plurality of depth maps is generated based on a respective combination of seismic survey, seismic survey interpretation in the time domain, velocity model, and depth conversion at a unique location in the subsurface region.

In some implementations, determining the respective weight values comprises setting a same weight value for each depth map of the plurality. In some implementations, determining the respective weight values comprises selecting different weight values for one or more respective depth maps of the plurality. In some implementations, determining the respective weight values comprises determining a value of a data quality metric of a seismic survey, interpretation, or velocity model that is used for generating a depth map of the plurality of depth maps; and selecting a weight value based on the value of the data quality metric. In some implementations, determining the respective weight values comprises training a machine learning model using data representing one or more labeled depth maps; inputting the data representing a plurality of depth maps into the trained machine learning model; and generating, by the trained machine learning model, a weight value for one or more of the depth maps.

In some implementations, generating data representing a combination of the plurality of depth maps comprises generating data including at least one of a mean, a standard deviation, or a statistical property of the plurality of depth maps.

In some implementations, the geological layer is associated with reference depths or datums considered in relation to the geological layer. For example, an oil water contact might be at 10,000 feet (functional test) depth and the geological layer (reservoir) might be modelled in a CDF such that 10,000 ft is the P10 depth. In this example, the geological layer is expected to be encountered above the oil water contact (which may be the desired outcome) with 90% confidence. The datums or reference depths represent one or more of an oil-water contact, a gas-oil contact, a gas-water contact, a $CO_2$-water contact, or a halocline.

In a general aspect, a data processing system for drilling a well into a subsurface formation, the system comprising: at least one processor; and memory storing instructions that, when executed by the at least one processor, cause the at least one processor to perform operations. The operations include performing a seismic survey of the subsurface formation; receiving data representing a plurality of depth maps for a given subsurface region, each depth map of the plurality of depth maps being generated from seismic data acquired in a seismic survey at a location in the subsurface region; determining, for one or more depth maps of the plurality, a respective weight value; generating data representing a combination of the plurality of depth maps based on the respective weight values of the one or more depth maps of the plurality; generating a cumulative distribution function (CDF) for a particular location in the subsurface region based on the data representing a combination of the plurality of depth maps; determining, for the particular location in the subsurface region based on the CDF for that particular location, a probability value representing a depth at which a geological layer occurs in the subsurface region at the particular location; and drilling the well into the subsurface formation at the particular location to a target depth based on the probability value representing a depth at which a geological layer occurs.

In some implementations, the operations include generating, based on the CDF for the well location, a visualization showing, for one or more depth values, an associated probability value.

In some implementations, each depth map of the plurality of depth maps is generated based on a respective combination of seismic survey, seismic survey interpretation in the time domain, velocity model, and depth conversion at a unique location in the subsurface region.

In some implementations, determining the respective weight values comprises setting a same weight value for each depth map of the plurality. In some implementations, determining the respective weight values comprises selecting different weight values for at least two respective depth maps of the plurality. In some implementations, determining the respective weight values comprises determining a value of a data quality metric of a seismic survey, interpretation, or velocity model that is used for generating a depth map of the plurality of depth maps; and selecting a weight value based on the value of the data quality metric. In some implementations, determining the respective weight values comprises training a machine learning model using data representing one or more labeled depth maps; inputting the data representing a plurality of depth maps into the trained machine learning model; and generating, by the trained machine learning model, a weight value for one or more of the depth maps.

In some implementations, generating data representing a combination of the plurality of depth maps comprises generating data including at least one of a mean, a standard deviation, or a statistical property of the plurality of depth maps.

In some implementations, geological layer is associated with reference depths or datums considered in relation to the geological layer. For example, an oil water contact might be at 10,000 feet (functional test) depth and the geological layer (reservoir) might be modelled in a CDF such that 10,000 ft is the P10 depth. In this example, the geological layer is expected to be encountered above the oil water contact (which may be the desired outcome) with 90% confidence. The datums or reference depths represent one or more of an oil-water contact, a gas-oil contact, a gas-water contact, a CO2-water contact, or a halocline.

In a general aspect, a method performed by a data processing system configured to generate probabilistic data for planning a well depth for subsurface exploration, the method comprising: receiving data representing a plurality of depth maps for a given subsurface region, each depth map of the plurality of depth maps being generated from seismic data acquired in a seismic survey at a location in the subsurface region; determining, for one or more depth maps of the plurality, a respective weight value; generating data representing a combination of the plurality of depth maps based on the respective weight values of the one or more depth maps of the plurality; generating a cumulative distribution function (CDF) for a particular location in the subsurface region based on the data representing a combination of the plurality of depth maps; and determining, for the particular location in the subsurface region based on the CDF for that particular location, a probability value representing a depth at which a geological layer occurs in the subsurface region at the particular location.

In a general aspect, one or more non-transitory computer readable media store instructions configured to cause at least one processor, when executing the instructions, to perform operations including receiving data representing a plurality of depth maps for a given subsurface region, each depth map of the plurality of depth maps being generated from seismic data acquired in a seismic survey at a location in the subsurface region; determining, for one or more depth maps of the plurality, a respective weight value; generating data representing a combination of the plurality of depth maps based on the respective weight values of the one or more depth maps of the plurality; generating a cumulative distribution function (CDF) for a particular location in the subsurface region based on the data representing a combination of the plurality of depth maps; and determining, for the particular location in the subsurface region based on the CDF for that particular location, a probability value representing a depth at which a geological layer occurs in the subsurface region at the particular location.

The embodiments described throughout this specification enable one or more of the following advantages. The processes enable a combination of realizations of depth maps for well planning for wells in new locations. The processes enable weighting of specific realizations within a cumulative distribution function describing the depth to target at a specific location for well planning. This is an improvement over existing mapping applications that allow for generation of statistics (such as standard deviation) that summarize entire sets of depth map realizations but do not allow for specific weighting of particular realizations. The result described in this specification enables an estimation of the target depth of a new well taking into account all available estimations of well outcomes and any preferential weighting of specific cases. This in turn allows for the proper preparation for drilling a well to the target depth.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

Figure 1:
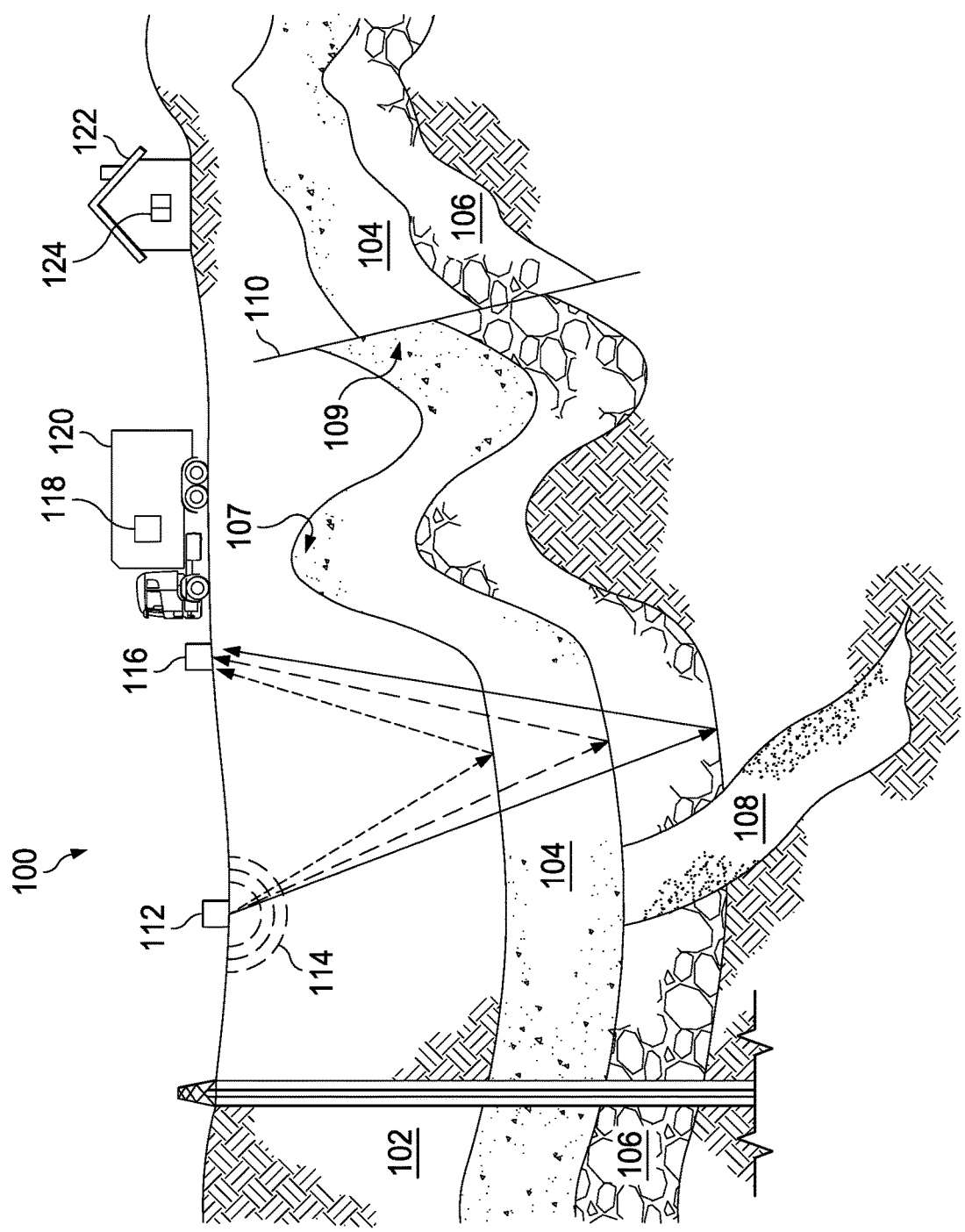
FIG. 1 is a schematic view of a seismic survey being performed to map subterranean features such as facies and faults.

This specification describes an approach for drilling wells into the deep subsurface, such as vertical or near-vertical wells in situations where multiple depth map realizations give a range of depth forecasts at new well locations. As subsequently described, the processes described in the specification utilize statistics derived from multiple map realizations of a given geological layer that could be, for example, an oil or water reservoir. The processes enable weighting of specific realizations for generation of a cumulative distribution function describing the depth to target at a specific location. The specific location represents the target of a new well.

The initial step of drilling a well is planning, part of which is performed to determine what a target depth of the well should be for a given well location. Alternatively, a location can be selected from the structural map or maps on the basis of a required target depth. The target depth at a specific location is determined from an analysis of geological features of the subsurface region at the specific location. Once the target depth is known, the appropriate quantities of well construction hardware can be prepared in advance of drilling, reducing drilling time and drilling costs. After these preparations, the well can be drilled to the target depth.

The processes are generally applicable when more than one depth realization is available. Here, a depth realization includes a velocity model of the subsurface in the region of the new well. The velocity model represents the spatial variation in seismic velocities that allows a seismically-interpreted map which is generated in the inherent time domain of reflection seismic data (i.e. the vertical dimension is time not distance), to be transformed into a map of geological layers of the subsurface using the simple relationship distance=velocity*time. The velocity model is generated using seismic data gathered from arrays of sensors and receivers, described in relation to FIG. 1. Each depth realization for a particular location can be based on seismic data confirmed and supplemented by site-specific data acquired at nearby locations where drilling has been performed. Each velocity model, and therefore each depth realization, is an indirect estimate of the depths of subterranean features (such as geological layers) at the particular location of the target well. Because the various depth realizations can each be based on different data from different well locations, each depth realization can provide a different estimate of depths of geological layers at the target location. In another example, different depth conversion algorithms are used to produce alternative realizations of a depth map for the given subsurface region.

The processes subsequently described include using a result of a combination of the different depth conversion algorithms for well planning. Depth conversion methods may be based on seismic velocities derived from, for example, reflection seismic survey data or they may be derived from well data, or both. Well data that underpin velocity models includes direct velocity measurement such as checkshots or Vertical Seismic Profiles (VSPs) and indirect measurements such as sonic logs that may be integrated over some or all of the well depth. These sources of velocity information can be built into a velocity model consisting of one or more layers where each layer may have varying velocity according to the control data and some interpolating function. Various time domain maps and velocity models can be combined to yield a series of depth domain model and maps (e.g., maps 202a-i, subsequently described in relation to FIGS. 2A-2I).

A data processing system is configured to derive a cumulative distribution function (CDF) from a set of depth values at a planned well location. The set of depth values is subsequently described in relation to FIGS. 2A-2I. Generally, a set of two to ten depth map realizations are provided for generation of the CDF. However, additional depth map realizations can be included if available, and there is no upper limit on number of realizations that can be included.

The data processing system generates a resulting estimation having a clear visualization of depth uncertainty, as quantified by the multiple depth map realizations and the CDF that represents the range of provided realizations. The data processing system can be configured to derive a CDF for which each of the provided realizations (such as maps 202a-i subsequently described) are equally-weighted cases from a normally distributed population in terms of the predicted geological target depth at the planned well location. However, other distributions are possible, such as a Poisson distribution, a lognormal distribution, and so forth. In some implementations, the data processing system is configured to apply different weights or unique weights to each of the different depth realizations. Weight assignment can be automatic based on a set of assignment criteria, or performed manually at a user's discretion. For example a higher level of confidence (and thus a greater weight value) may be placed on a specific realization due to the particulars of the workflow that produced it. Any weight value can be assigned to individual realizations of the set.

The data processing system is configured to receive data, for performing a probabilistic well depth prognosis, in addition to the set of depth realizations. For example, the data processing system receives oil water contact data indicative of locations of liquids (oil or water) in the subsurface. Oil-water contact is generally at a fixed, known depth. This data can be displayed on a map as a contour, or it could be indicated on CDF charts (e.g., the graphs 302, 304, and 306 of FIGS. 3A-3C) as a line at the given depth. The intersection of this constant depth line with the CDF gives a probability of the well depth being above or below the contact based on the available maps. In other cases, oil-water contact depth is unknown or not precisely known for a given region. In such a case, the oil-water contact depth is assigned a depth range between two specific depths that fix the shallowest and deepest possible depths at which the oil-water contact depth is feasible. In another example, the oil-water depth is represented probabilistically, such as using a P90–P10 depth range. Oil-water contact may not be horizontal over an area of interest (due to hydrodynamics of the reservoir or segmentation of the field). In such a case, a unique contact depth or depth range is to be extracted from the spatial information of the region that is then annotated on the CDF as described above. Other types of boundary might be Gas-Oil contact, Gas-water contact, CO2-water contact, halocline, and so forth.

Figure 3A:
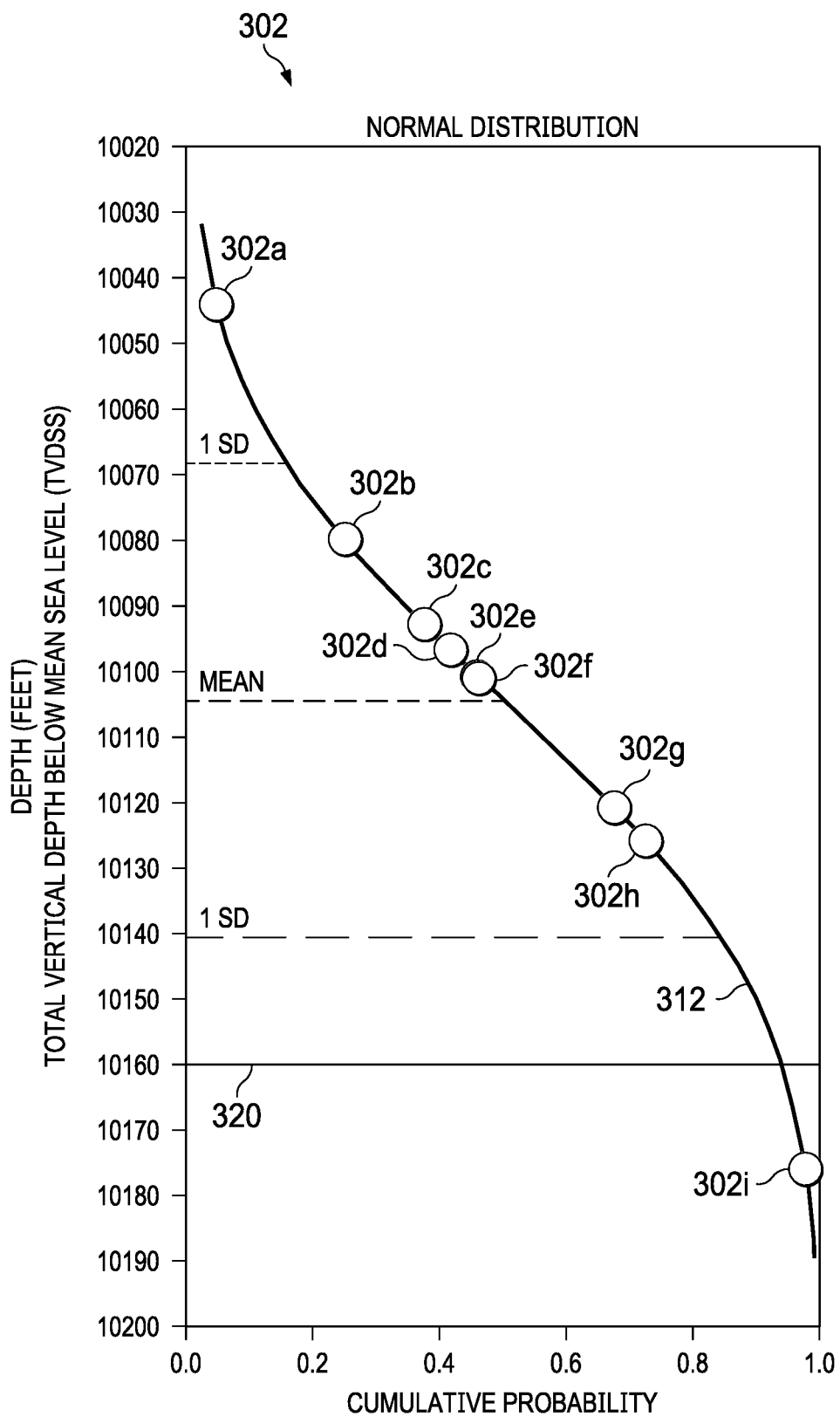
FIGS. 3A-3C illustrate representations of CDFs generated from the depth maps of FIGS. 2A-2I and from combination data illustrated in FIG. 2J, corresponding to location "X" shown in FIGS. 2A-2J.
Figure 3B:
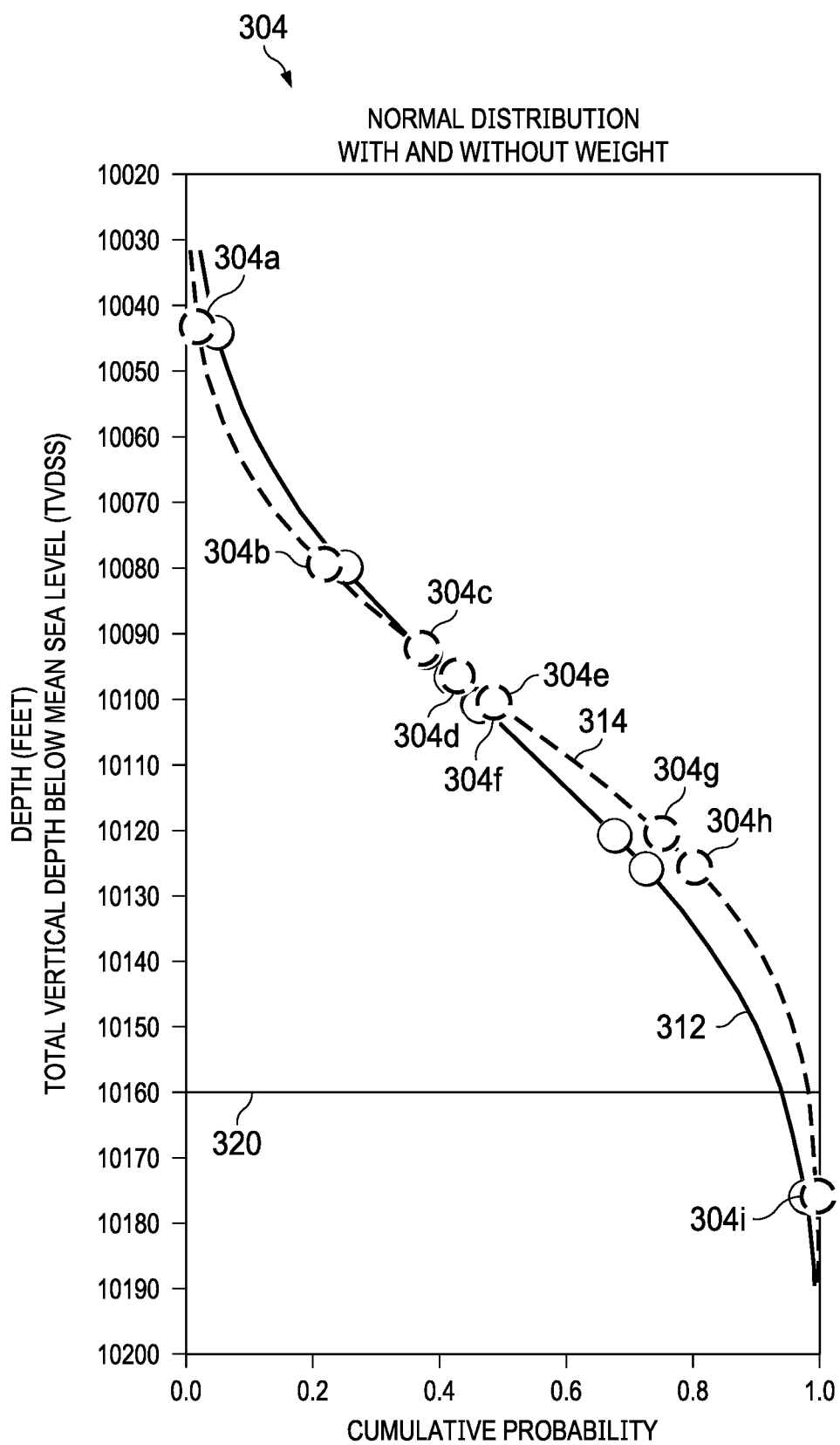
Figure 3C:
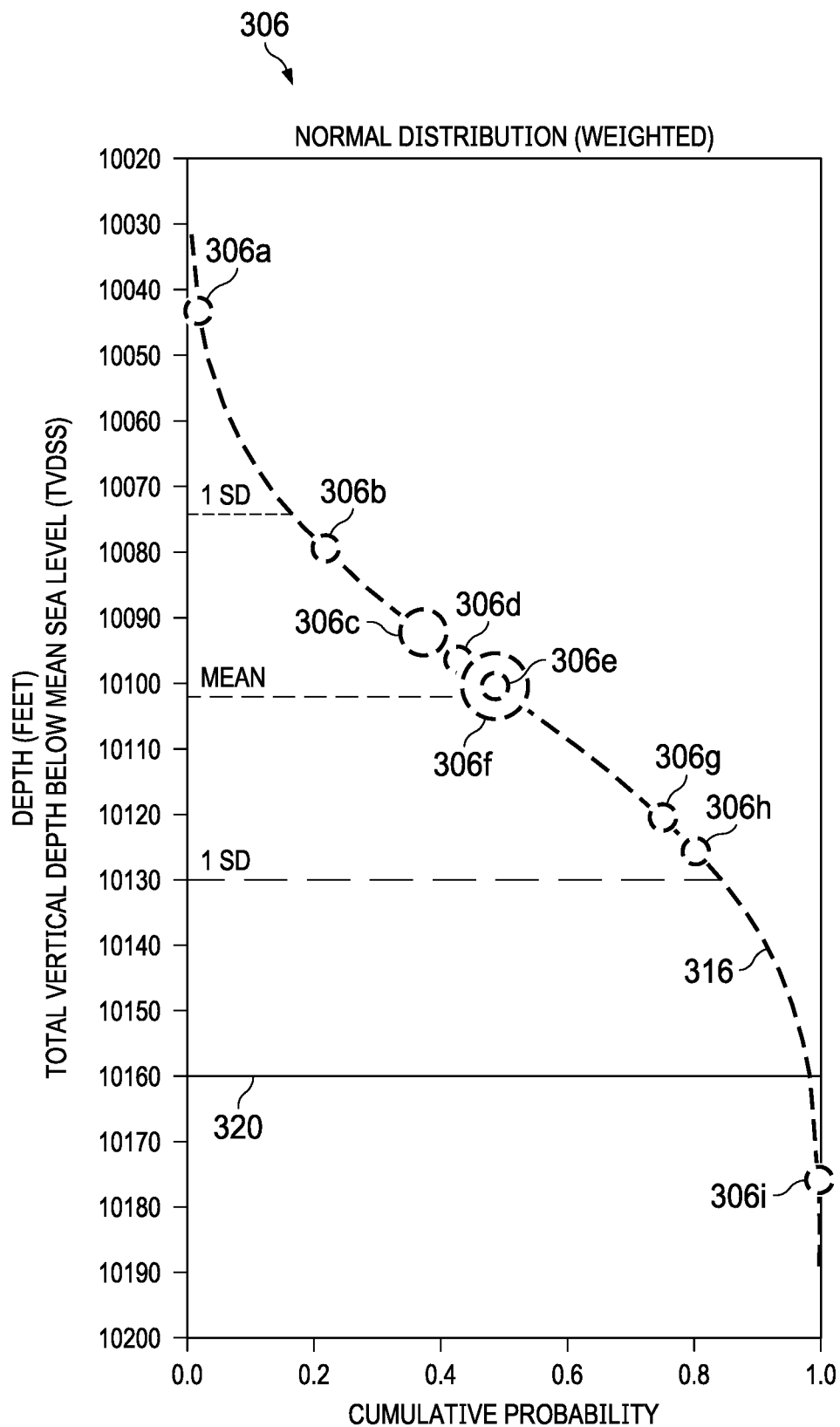

The data processing system performs a depth forecast including generating a probability value with a standard deviation value. The output is selectable at the discretion of a user. The output is influenced by relative weighting of the depth map realizations, but not necessarily coincident with a specific depth realization. While programmable rules can be included for consideration of weight values, the weight values are generally specified by a user. The data processing system prognoses output is reported in probabilistic terms to enable stakeholders (such as project managers and budget holders) to make fully informed decisions about supporting a well proposal or calling for alternatives with a different uncertainty profile. For example, an oil water contact is known to exist at a depth of 10,160 feet using True Vertical Depth below Mean Seal Level (TVDSS) in a general vicinity for a particular well proposal in a particular region. This line is shown by line marked 320 in each of the graphs 302, 304, and 306. In this example, as shown in FIGS. 3A-3C, the map realizations indicate that, based on the population of available depth map realizations, there is a 94% probability of the well encountering reservoir above the oil water contact if the realizations are equally weighted. In this example, the map realizations indicate that, there is a 98% probability of the well encountering reservoir above the oil water contact if the realizations are weighted as shown in FIGS. 3A-3C.

The output probabilities provide an indication that some part of the reservoir will be encountered above the specified oil-water contact. For example, the output of 94% indicates a 94% or higher probability. A primary objective of the well can be to encounter the reservoir above the oil-water contact depth. The output quantifies the impact or value of weighting specific depth cases in a given region. This aspect of planning is otherwise difficult to quantify. The output enables a cost-benefit analysis of additional work performed at a planning stage. In this example, if an expert consultant had recommended a specific scenario (such as map 202e subsequently described), the data processing system is configured to determine that the impact or benefit of this weighting is an increase in probability of some 4% over simply weighting all the cases equally. The time and financial cost of this technical review are evaluated to determine if they are worth the benefit.

As previously stated, the prognosis may also determine the chance of success of the well objective in relation to subsurface datums such as oil-water contact. Other datums that are commercially significant could apply. For example, depths of gas-oil contact, gas-water contact, or a $CO_2$-water contact could be considered. In another example, a datum can include a depth defined in terms of a required vertical offset from a physical boundary such as a certain depth below or above an oil-water contact.

Additionally, these data support approval of drilling projects. In some implementations, these data cause locations to be modified or selected in accordance with a desired risk profile of the project. An improved selection of well location results in savings of time and cost and an increased frequency of well objectives delivery for multi-well drilling programs. For example, a well location to be changed when there is an insufficient probability of a given reservoir thickness being shallower than a fixed datum such as a known oil-water contact. The probability threshold may be defined on the basis of a commercial analysis of the volumes of fluid (e.g. oil) that would be established by a given reservoir thickness above the known oil water contact.

FIG. 1 is a schematic view of a seismic survey being performed to map subterranean features such as facies and faults in a subterranean formation 100. FIG. 1 shows an example of acquiring seismic data using an active source 112. This seismic survey can be performed to obtain seismic data (such as acoustic data) used to generate a depth map in the subterranean formation 100.

The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

In some contexts, such as shown in FIG. 1, an active seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface.

The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

During some fracking contexts, rather than an active source 114, a hydraulic fracturing fluid, such as water with minerals included, is pumped into the wellbore and is used to generate vibrations in the subsurface. In some examples, the vibrations caused by the injection of the fluid can be used to obtain vibration data from the subsurface. This is a passive data acquisition approach. Rather than generating seismic body waves 114, the passive approach generates guided tube waves which are used to measure the fractures in the subsurface. In the context of FIG. 1, an active source 112 can be used to map the subsurface either individually or in combination with the passive sources.

The seismic waves 114 are received by a sensor or sensors 116. The sensors 116 can be geophone-receivers that produce electrical output signals transmitted as input data, for example, to a computer 118 on a seismic control truck 120.

Based on the input data, the computer 118 may generate a seismic data output, for example, a seismic two-way response time plot. The sensors 116 are generally housed in a modular unit on or near the wellhead. The recorded seismic data are transmitted to nearby processing center (such as center 122 subsequently described) using wireless transmission. Because the recorded seismic data includes only one or several channels, depending on the number of the sensors 116, the data size of the seismic data is very small relative to seismic data gathered from dense 3D sensor arrays typical for SWF contexts. This is true even after the sensors 116 are recording continuously for several days. Therefore, data processing and delivery are relatively efficient compared to data produced by the dense 3D sensor arrays. The smaller data size enables real-time monitoring of the hydraulic fractures of the environment 100.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems that provide additional information about the subterranean formation. For example, the control center 122 can receive data from a computer 119 associated with a well logging unit 121. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Figure 2A:
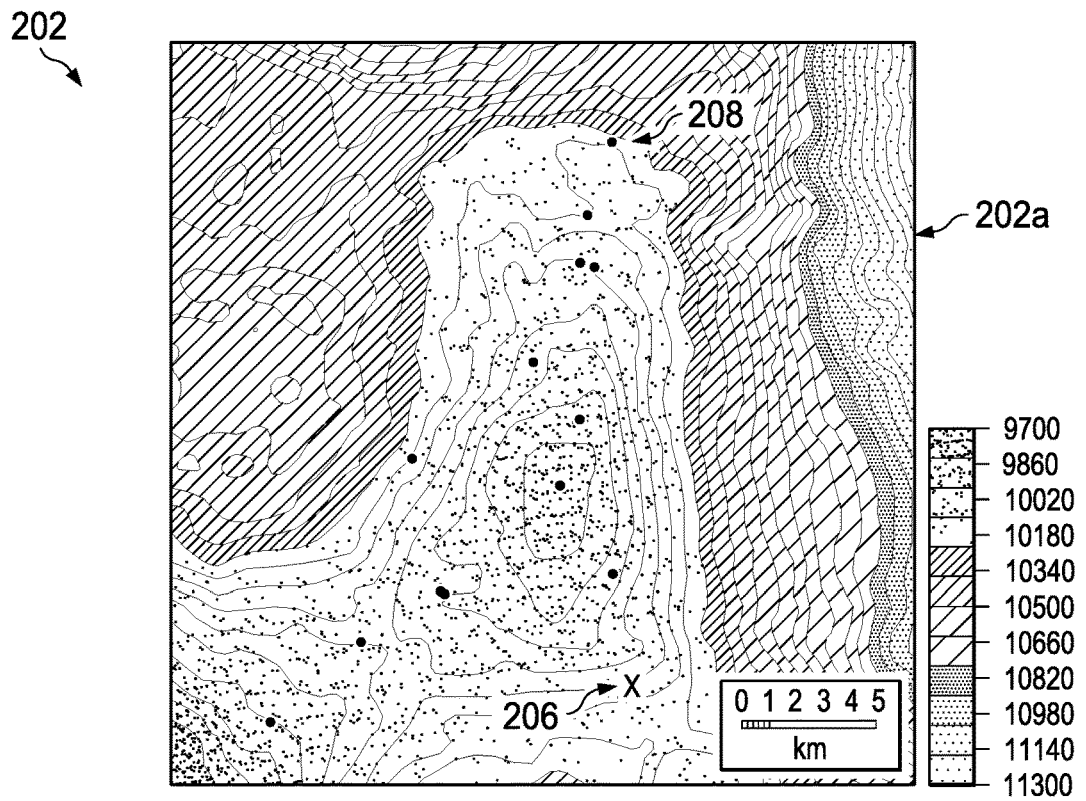
FIGS. 2A-2I each illustrate a depth map of a plurality of depth maps.
Figure 2B:
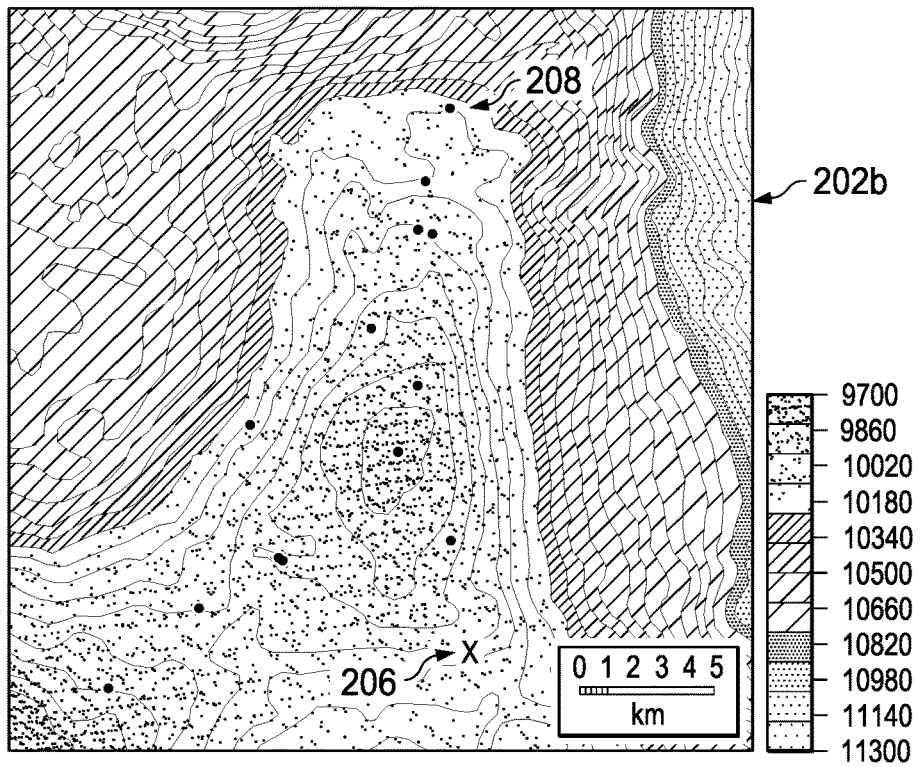
Figure 2C:
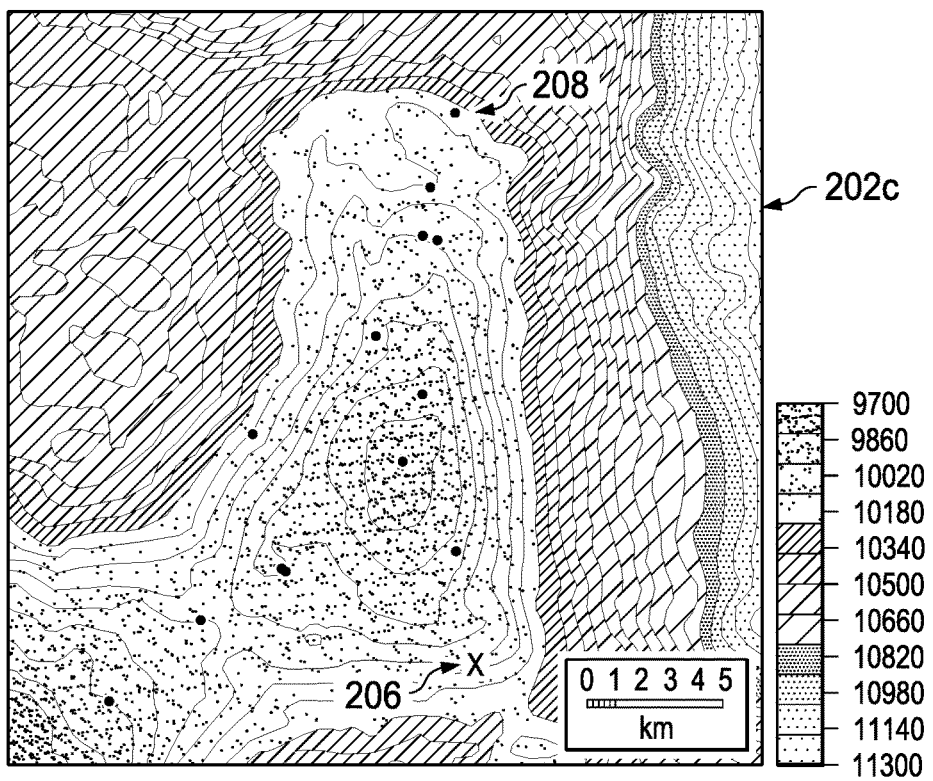
Figure 2D:
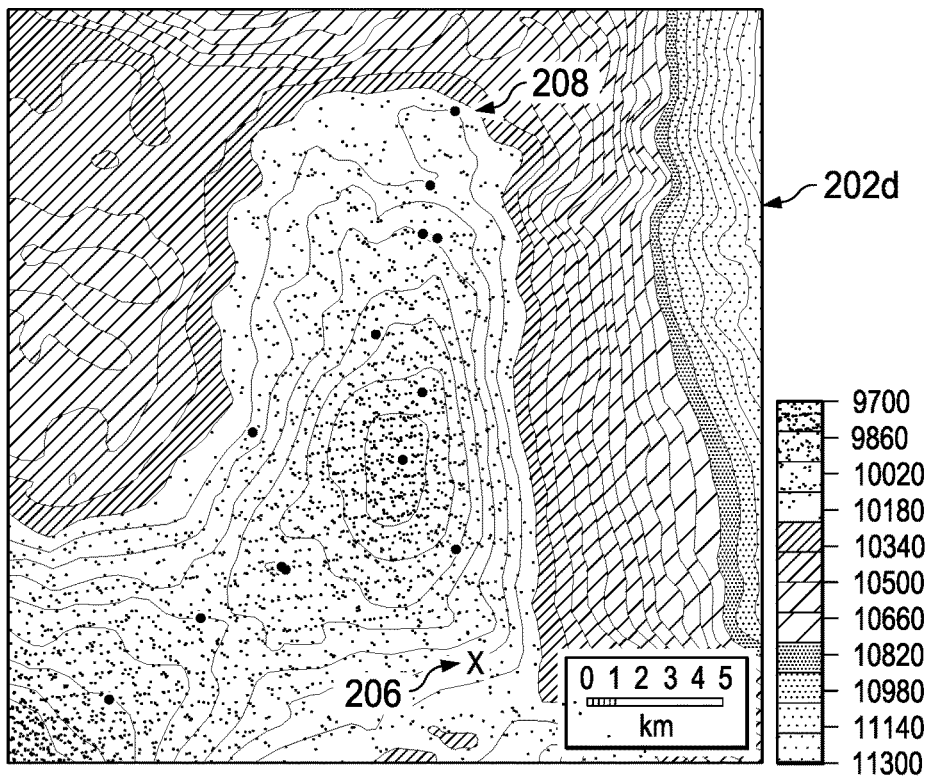
Figure 2E:
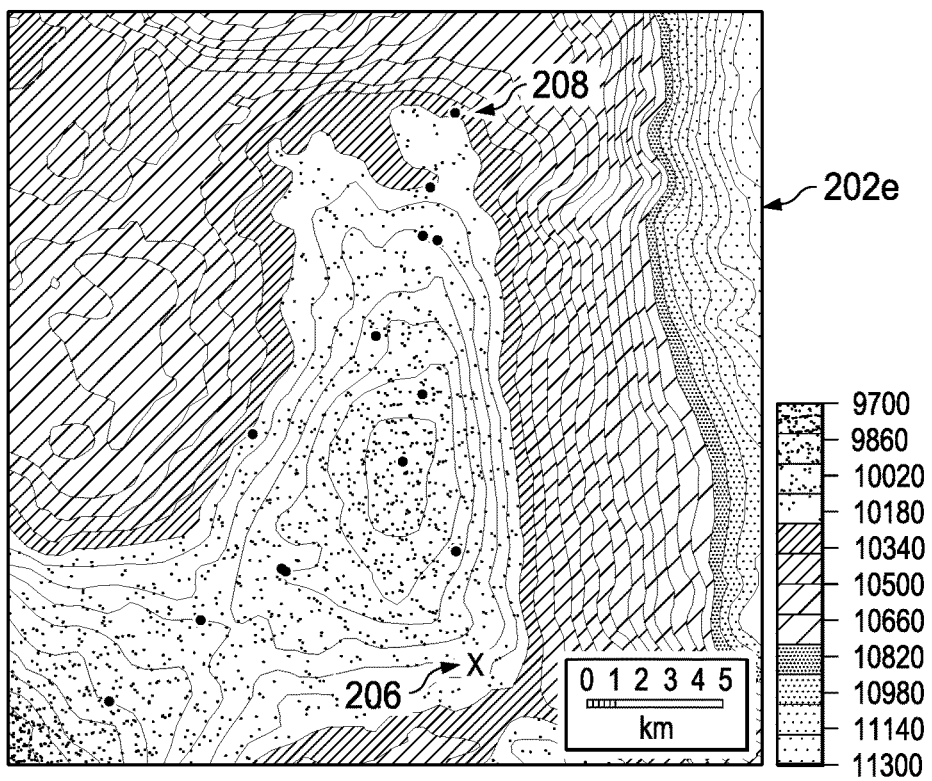
Figure 2F:
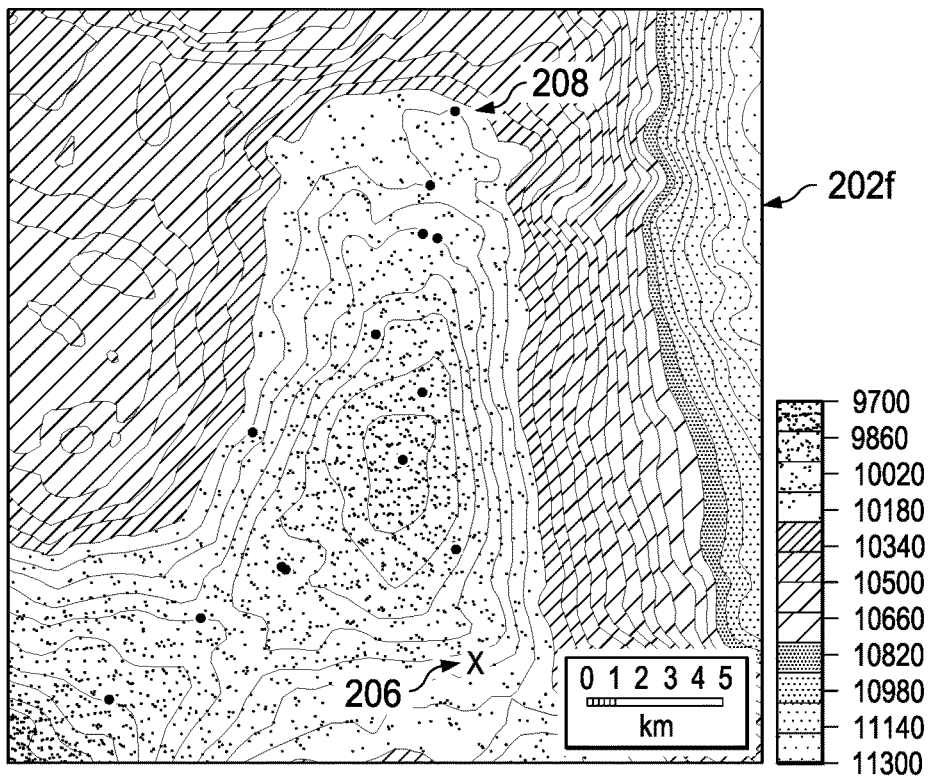
Figure 2G:
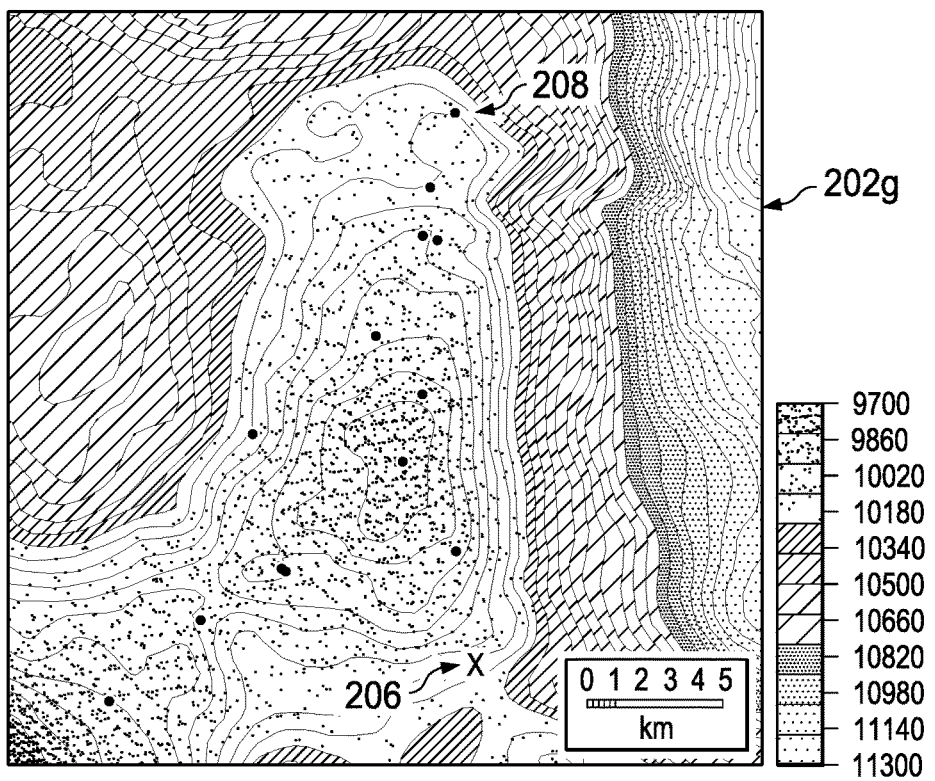
Figure 2H:
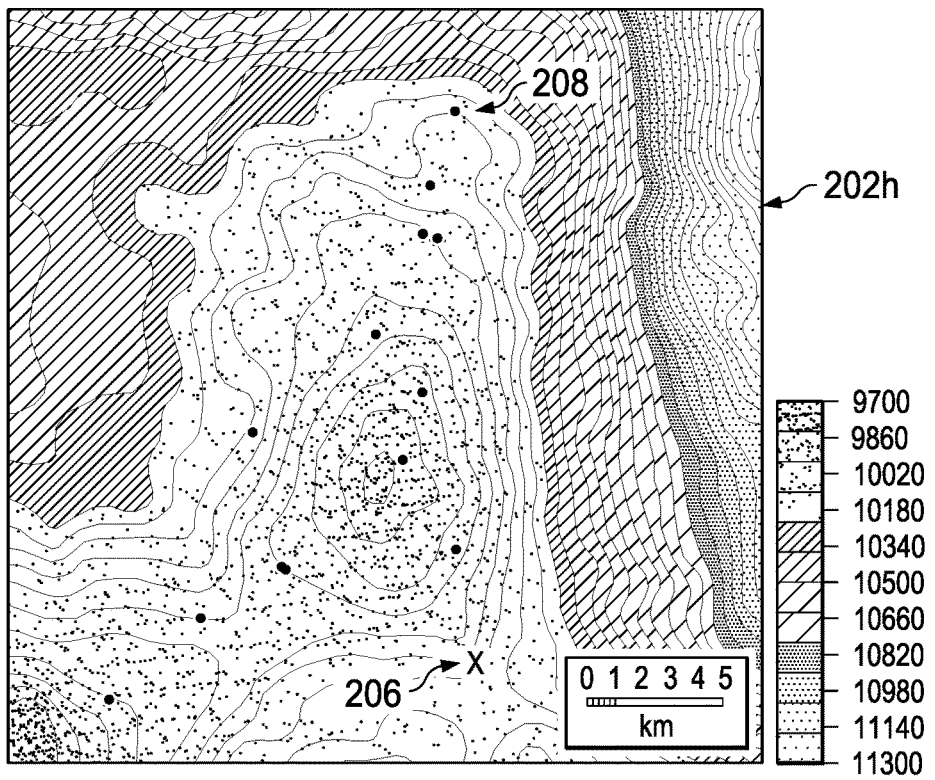
Figure 2I:
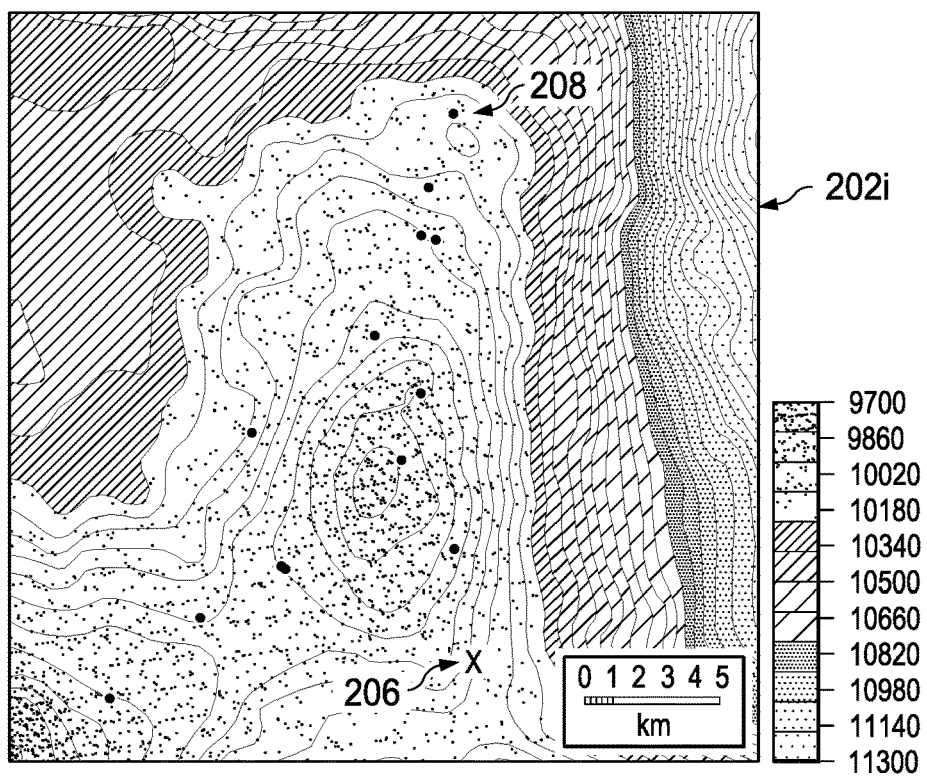

FIGS. 2A-2I each shows a representation of a respective depth map of a set of depth maps 202 representing different interpretation and depth conversion (velocity model) scenarios 202a-i for a particular region. The velocity model scenarios resulting in maps 202a-i represent available velocity models (e.g., a total population of velocity models) for the particular region. A data processing system is configured to extract depth values at a given location, which may correspond to a location of a new planned well. The data processing system is configured to determine a set of depth values from each depth map 202a-i realization at a specific, potential new well location. In this example, each of the maps 202a-i represents a same geological layer. Each of the marked locations (such as location 208) shown as dots in each of the maps 202a-i represent existing wells that penetrate the surface of the common region shown in each of the maps 202a-i. These measurements constrain the models to the actual depth at these locations, therefore all the maps should contain the same depth values at these points and as a result, the Standard Deviation between maps 202a-i is zero at these control points (as shown in FIG. 2B).

The gradient represents the estimated depths from each of the velocity models represented by respective maps 202a-i. The depth is measured in vertical depth units (e.g. feet or meters). The realizations are made using the same units (e.g. feet or meters) as one another, but there is no restriction on the actual choice of units as long as the choice is consistent across all realizations. An example legend is shown in each map 202a-i. The location 206 marked with an "X" in the map 202a-i corresponds to the particular well location for which the process is performed by the data processing system in the example described in relation to FIG. 5. The contour interval on the maps 202a-i is 50 feet in depth, but the method and results are not tied to a specific contour interval or measurement unit.

Figure 2J:
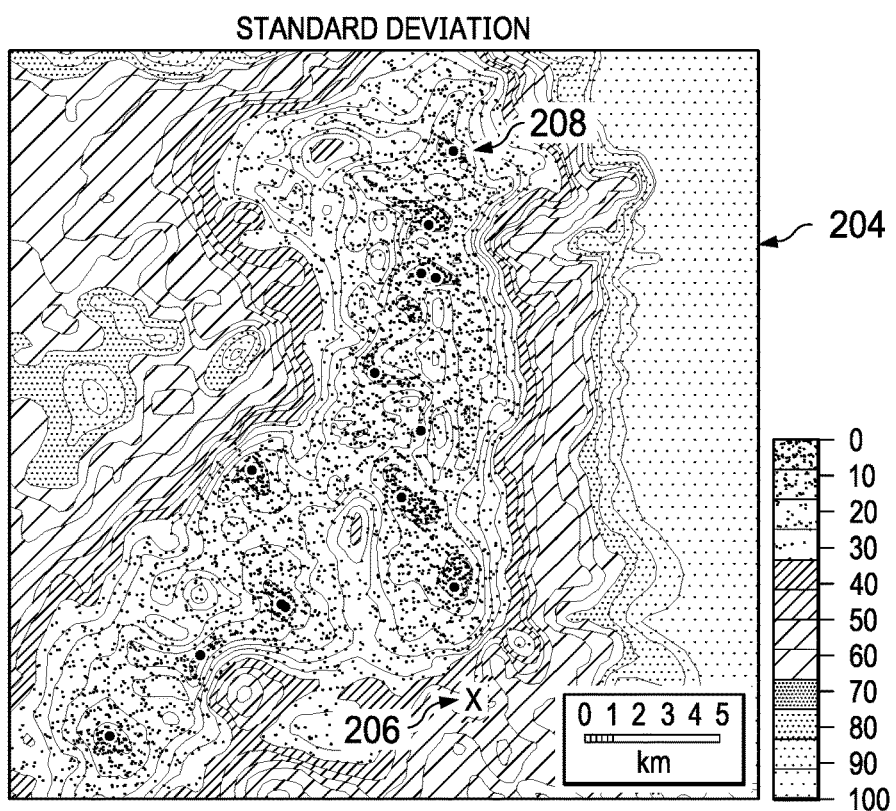
FIG. 2J illustrates a combination of the plurality of depth maps of FIG. 2A, specifically the Standard Deviation.

FIG. 2J shows a Standard Deviation map 204 which is a representation of a combination of the depth maps 202a-i. In this example, the map 204 is a Standard Deviation that summarizes variation between the depth maps 202a-i. Similar to maps 202a-i, each of the marked locations in map 204 (such as location 208) shown as dots represent existing wells that penetrate the surface of the subsurface region shown in map 204. These measurements describe the variation in the available depth realizations in terms of the actual depth at these locations. The gradient represents the Standard Deviation values of the depth map realizations of FIGS. 2A-2I about the P50 depth. The Standard Deviation value is measured in the same vertical depth units (e.g. feet or meters) as the maps 202a-i. The location 206 marked with an "x" in the map 204 corresponds to the particular well location for which the process is performed by the data processing system in the example described in relation to FIG. 5.

The data processing system performs the process for probabilistic well depth prognosis in scenarios for drilling vertical or near-vertical wells. Vertical or near-vertical wells generally include wells with planned inclination less than ten degrees. Vertical or near-vertical well types are common in exploration and delineation projects. Inclined wells are more usually drilled in mature projects, such as oil production projects. Inclined wells generally include design of particular intersection characteristics with key horizons that are unique to the particular well. In contrast, for a vertical well or near-vertical well, a set of depths at the particular well location are presented in the form of a cumulative distribution function (CDF).

FIGS. 3A-3C show illustrations of graphs 302, 304, and 306, respectively, each graph including a respective cumulative distribution function (CDF) 312, 314, and 316 of forecast depths at a given a planned well location. The data processing system derives the CDFs 312, 314, and 316 of respective graphs 302, 304, and 306 from the nine different depth map realizations shown in FIGS. 2A-2I at location 206 marked by the "X". Graph 302 shows results 302a-i of depth realizations arranged in a CDF with each realization 302a-i weighted equally. Realization values 302a-i correspond to respective maps 202a-i.

In this example, the range variation shown is about 140 feet. The maximum variation from the mean shown is about 70 feet. The operational consequences of a particular geological layer being 100 feet deeper or shallower than modeled are situational but the data processing system is configured to enable planners to avoid these consequences. For example, an operational sensitivity can be within 100 feet of the mean realization. For example, a delineation well is being drilled on a low relief structure downdip and several kilometers from a discovery with a 100 ft. oil column. In this example, the spread of outcomes at the new well location results in the top of the reservoir unit occurring about 30 ft. above an established oil-water contact in the discovery well. In contrast, the range of pre-well forecast outcomes may indicate the delineation well could find a reservoir several tens of feet below the oil-water contact line, and the well fails its objective, wasting time and resources. The probability output enables users to avoid this result.

These results prevent undesirable outcomes. For example, if a delineation well is drilled too low, the well may be entirely wasted and time and expense for drilling the well is lost. The data processing system enables high uncertainty well locations to be rejected in favor of sites that have lower uncertainty, or sites whose uncertainty range are entirely compatible with well objectives. In some implementations, well locations are actively targeted at areas of high depth uncertainty to reducing depth uncertainty to zero by drilling the reservoir at that location. This information can be significant for overall project uncertainty management, and provide value. As previously stated, an awareness of the depth uncertainty allows appropriate amount of well construction materials, such as casing, to be ordered and available before the well begins, removing this aspect of the supply chain from the critical path on the project timeline.

Graph 304 shows the same set of realization values 304a-i as 302a-i, but some of the values 304a-i are assigned different weight values than realization values 302a-i. Here, the result of map 202c is weighted by a factor of three and the result of map 202e is weighted by a factor of five relative to all the other maps 202a, 202b, 202d, 202f, 202g, and 202i which each are associated with a weighting value of one. The unweighted CDF 312 is shown with the unweighted realization values 302a-i. The weighted CDF 314 is shown on the same graph 304 with weighted realization values 304a-i. Realization values 304a-i correspond to respective maps 202a-i.

Weight values are determined based on a number of factors. The weight factors can be chosen based on the quality or reliability of seismic data associated with a particular seismic survey. A higher quality survey can result in an increased weight value. In some implementations, the weight value can be based on how recent the seismic survey was conducted for generating a given velocity model. Other metrics are possible. In some implementations, machine learning can be introduced to determine the values of weights. For example, reliable surveys can be introduced to a machine learning model as training data. The machine learning model can be used to automatically weight depth maps based on the training data. In some implementations, the weighting is performed manually by subject matter experts reviewing the depth maps from velocity data and corresponding seismic data. In some implementations, a higher weight is assigned to velocity models generated from seismic surveys that are certified or follow a prescribed technical standard.

Graph 306 shows a weighted CDF 316 which corresponds to the CDF 314 shown in graph 304. In graph 306, a size of the realization data points 306a-i, which correspond to values 202a-i (similarly to points 302a-i and 304a-i), is scaled in proportion to the weighting associated with the respective value. This is an example of a visual enhancement to make it clear which cases have been weighted, and by approximately how much, within the CDF. While the depth units are in feet TVDSS, any depth units and measurement data can be used.

Figure 4:
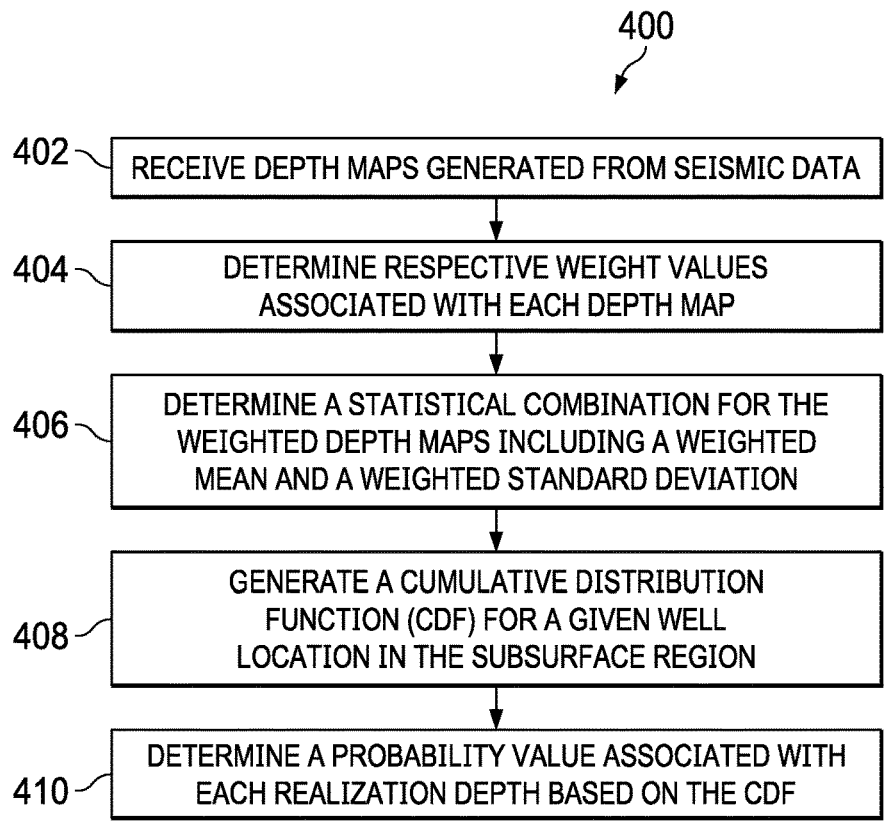
FIG. 4 is flow diagram illustrating a process for predicting well depth at a particular location using a plurality of depth maps.
Figure 5:
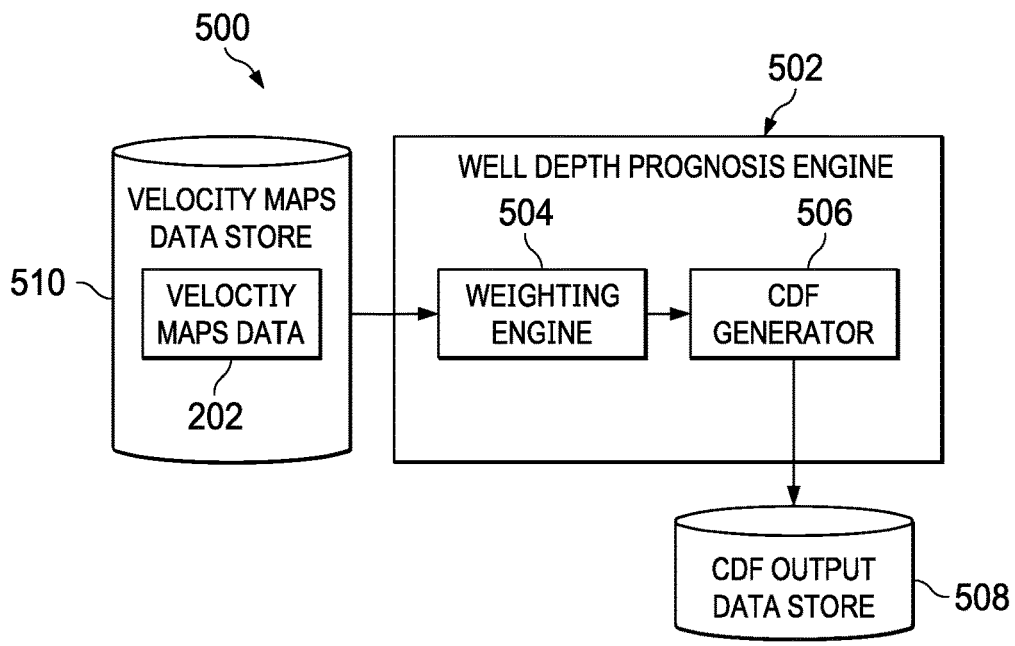
FIG. 5 illustrates an example data processing system for performing the method of FIG. 4.

Turning to FIGS. 4 and 5, a method 400 for generating a probabilistic well depth prognosis and a data processing system 500 for performing the method 400 are shown. The data processing system 500 is configured to receive depth maps data 202 from a data store 510. The data processing system 500 includes a well depth prognosis engine 502 including a weighting engine 504 and a CDF generator 506. The weighting engine 504 is configured to determine weights for each of the maps of the maps data 202 (e.g., maps 202a-i) in accordance with method 400. The CDF generator 506 is configured to generate a CDF using the determined weightings and corresponding realizations of the map data 202 in accordance with method 400. The well depth prognosis engine is configured to output a value representing a probability of a well at a given location encountering reservoir above the oil water contact depth.

In addition to the steps subsequently described, the data processing system 500 can be configured to perform a seismic survey as described in relation to FIG. 1. The data processing system 500 is configured to receive reflection seismic data such as Vibroseis acoustic data. The data processing system is configured to perform filtering of the data received at the receivers. The data processing system 500 is configured to perform stacking of the data traces to reduce noise and extract the signal. The data processing system 500 is configured to perform migrating of the traces as needed.

Turning to FIG. 4, the method 400 for generating a probabilistic well depth prognosis is performed as follows. The data processing system 500 is configured to receive (402), data comprising a plurality of depth maps generated from seismic data, interpreted into time domain maps that are convolved with various depth conversions as previously described. In some implementations, if there are enough wells, a depth map is generated from data representing the well control points alone, without seismic data. Each of the depth maps of the plurality represents a common subsurface region including a particular location at which a new well is being planned. The depth maps are also referred to as depth realizations. The data processing system 500 determines (404) a statistical combination for the weighted depth maps including a weighted mean and a weighted standard deviation. In some implementations, weights are not applied to any of the realizations (or the realizations are equally weighted), and a mean and standard deviation are determined for the unweighted depth maps.

In some implementations, the data processing system 500 selects weight values for one or more depth maps from the set. As previously described, the weights can be selected based on factors such as a quality of the seismic survey, a time period associated with the seismic survey (e.g., more recent or older data), or other similar metrics. The data processing system 500 determines (408) a statistical combination for the weighted depth maps including a weighted mean and a weighted standard deviation for the weighted depth maps.

The data processing system 500 is configured to generate (408) a cumulative distribution function (CDF). The CDF can be represented as a graph or chart (as shown in FIGS. 3A-3C). The CDF is produced from a set of depths sampled at the intersection of the planned well location and each of the available depth map realizations. The data processing system 500 can output a visualization of the CDF. In some implementations, the CDF is sent to another application for further analysis. In some implementations, a decision point is resolved based on a given probability value. For example, if the probability exceeds a threshold, the well location and depth are chosen.

After the well location and depth are chosen, the process 400 can include drilling a well borehole and installing well hardware into the borehole to the actual depth. In the drilling process, the appropriate amount of hardware can be preordered to streamline the drilling process and reduce costs of both materials and time.

The data processing system 500 determines (410) a probability value associated with each realization depth based on the CDF. As previously described, the probability value is indicative that some part of the reservoir will be encountered above the specified oil-water contact or similar datum. A higher probability indicates a likelier chance of a successfully met objective for the well at that location. Well objectives could be specified in a number of alternative ways in relation to depth uncertainty. For example a well could be located specifically at the area of largest depth uncertainty (highest values of Standard Deviation) in order to have a significant impact in terms of uncertainty reduction if so desired.

Figure 6:
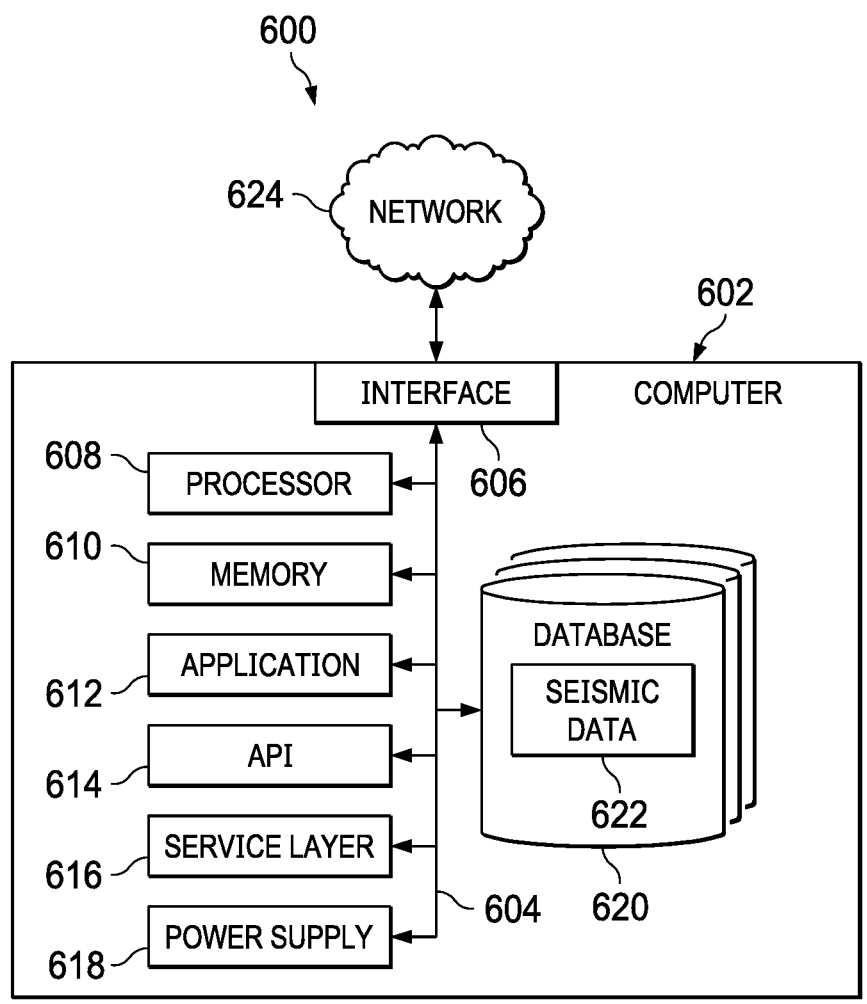
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example data processing system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 604. In some implementations, any or all of the components of the computer 602, including hardware or software components, can interface with each other or the interface 606 (or a combination of both), over the system bus 604. Interfaces can use an application programming interface (API) 614, a service layer 616, or a combination of the API 614 and service layer 616. The API 614 can include specifications for routines, data structures, and object classes. The API 614 can be either computer-language independent or dependent. The API 614 can refer to a complete interface, a single function, or a set of APIs.

The service layer 616 can provide software services to the computer 602 and other components (whether illustrated or not) that are communicably coupled to the computer 602. The functionality of the computer 602 can be accessible for all service consumers using this service layer. Software services, such as those provided by the service layer 616, can provide reusable, defined functionalities through a defined interface. For example, the interface can be software written in JAVA, C++, or a language providing data in extensible markup language (XML) format. While illustrated as an integrated component of the computer 602, in alternative implementations, the API 614 or the service layer 616 can be stand-alone components in relation to other components of the computer 602 and other components communicably coupled to the computer 602. Moreover, any or all parts of the API 614 or the service layer 616 can be implemented as child or sub-modules of another software module, enterprise application, or hardware module without departing from the scope of the present disclosure.

The computer 602 includes an interface 606. Although illustrated as a single interface 606 in FIG. 6, two or more interfaces 606 can be used according to particular needs, desires, or particular implementations of the computer 602 and the described functionality. The interface 606 can be used by the computer 602 for communicating with other systems that are connected to the network 630 (whether illustrated or not) in a distributed environment. Generally, the interface 606 can include, or be implemented using, logic encoded in software or hardware (or a combination of software and hardware) operable to communicate with the network 630. More specifically, the interface 606 can include software supporting one or more communication protocols associated with communications. As such, the network 630 or the hardware of the interface can be operable to communicate physical signals within and outside of the illustrated computer 602.

The computer 602 includes a processor 608. Although illustrated as a single processor 608 in FIG. 6, two or more processors 608 can be used according to particular needs, desires, or particular implementations of the computer 602 and the described functionality. Generally, the processor 608 can execute instructions and can manipulate data to perform the operations of the computer 602, including operations using algorithms, methods, functions, processes, flows, and procedures as described in the present disclosure.

The computer 602 also includes a database 620 that can hold data (for example, seismic data 622) for the computer 602 and other components connected to the network 630 (whether illustrated or not). For example, database 620 can be an in-memory, conventional, or a database storing data consistent with the present disclosure. In some implementations, database 620 can be a combination of two or more different database types (for example, hybrid in-memory and conventional databases) according to particular needs, desires, or particular implementations of the computer 602 and the described functionality. Although illustrated as a single database 620 in FIG. 6, two or more databases (of the same, different, or combination of types) can be used according to particular needs, desires, or particular implementations of the computer 602 and the described functionality. While database 620 is illustrated as an internal component of the computer 602, in alternative implementations, database 620 can be external to the computer 602.

The computer 602 also includes a memory 610 that can hold data for the computer 602 or a combination of components connected to the network 630 (whether illustrated or not). Memory 610 can store any data consistent with the present disclosure. In some implementations, memory 610 can be a combination of two or more different types of memory (for example, a combination of semiconductor and magnetic storage) according to particular needs, desires, or particular implementations of the computer 602 and the described functionality. Although illustrated as a single memory 610 in FIG. 6, two or more memories 610 (of the same, different, or combination of types) can be used according to particular needs, desires, or particular implementations of the computer 602 and the described functionality. While memory 610 is illustrated as an internal component of the computer 602, in alternative implementations, memory 610 can be external to the computer 602.

The application 612 can be an algorithmic software engine providing functionality according to particular needs, desires, or particular implementations of the computer 602 and the described functionality. For example, application 612 can serve as one or more components, modules, or applications. Further, although illustrated as a single application 612, the application 612 can be implemented as multiple applications 612 on the computer 602. In addition, although illustrated as internal to the computer 602, in alternative implementations, the application 612 can be external to the computer 602.

The computer 602 can also include a power supply 618. The power supply 618 can include a rechargeable or non-rechargeable battery that can be configured to be either user- or non-user-replaceable. In some implementations, the power supply 618 can include power-conversion and management circuits, including recharging, standby, and power management functionalities. In some implementations, the power-supply 618 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for drilling a well into a subsurface formation, the method comprising:
    performing a seismic survey of the subsurface formation to generate seismic data;
    receiving data representing a plurality of depth maps for a subsurface region, each depth map of the plurality of depth maps being generated from the seismic data acquired in the seismic survey of the subsurface region;
    determining, for one or more depth maps of the plurality, a respective weight value;
    generating data representing a combination of the plurality of depth maps based on the respective weight values of the one or more depth maps of the plurality;
    generating a cumulative distribution function (CDF) for a particular location in the subsurface region based on the data representing a combination of the plurality of depth maps;
    determining, for the particular location in the subsurface region based on the CDF for that particular location, a probability value representing a depth at which a geological layer occurs in the subsurface region at the particular location; and
    drilling the well into the subsurface formation at the particular location to a target depth based on the probability value representing a depth at which a geological layer occurs.

2. The method of claim 1, further comprising generating, based on the CDF for the particular location, a visualization showing, for one or more depth values, an associated probability value.

3. The method of claim 1, wherein each depth map of the plurality of depth maps is generated based on a respective combination of seismic survey, seismic survey interpretation in a time domain, velocity model, and depth conversion at a unique location in the subsurface region.

4. The method of claim 1, wherein determining the respective weight values comprises:
    setting a same weight value for each depth map of the plurality.

5. The method of claim 1, wherein determining the respective weight values comprises:
    selecting different weight values for at least two respective depth maps of the plurality.

6. The method of claim 1, wherein determining the respective weight values comprises:
    determining a value of a data quality metric of a seismic survey, interpretation, or velocity model that is used for generating a depth map of the plurality of depth maps; and
    selecting a weight value based on the value of the data quality metric.

7. The method of claim 1, wherein determining the respective weight values comprises:
    training a machine learning model using data representing one or more labeled depth maps;
    inputting the data representing a plurality of depth maps into the trained machine learning model; and
    generating, by the trained machine learning model, a weight value for one or more of the depth maps.

8. The method of claim 1, wherein generating data representing a combination of the plurality of depth maps comprises generating data including at least one of a mean, a standard deviation, or a statistical property of the plurality of depth maps.

9. The method of claim 1, wherein the probability value representing the depth at which the geological layer occurs in the subsurface region at the particular location corresponds to an oil-water contact, a gas-oil contact, a gas-water contact, a $CO_2$-water contact, or a halocline.

10. A data processing system for drilling a well into a subsurface formation, the data processing system comprising:
    at least one processor; and
    memory storing instructions that, when executed by the at least one processor, cause the at least one processor to perform operations comprising:
        performing a seismic survey of the subsurface formation;
        receiving data representing a plurality of depth maps for a subsurface region, each depth map of the plurality of depth maps being generated from seismic data acquired in a seismic survey at a location in the subsurface region;

determining, for one or more depth maps of the plurality, a respective weight value;

generating data representing a combination of the plurality of depth maps based on the respective weight values of the one or more depth maps of the plurality;

generating a cumulative distribution function (CDF) for a particular location in the subsurface region based on the data representing a combination of the plurality of depth maps;

determining, for the particular location in the subsurface region based on the CDF for that particular location, a probability value representing a depth at which a geological layer occurs in the subsurface region at the particular location; and drilling the well into the subsurface formation at the particular location to a target depth based on the probability value representing a depth at which a geological layer occurs.

11. The data processing system of claim 10, the operations further comprising generating, based on the CDF for particular well location, a visualization showing, for one or more depth values, an associated probability value.

12. The data processing system of claim 10, wherein each depth map of the plurality of depth maps is generated based on a respective combination of seismic survey, seismic survey interpretation in a time domain, velocity model, and depth conversion at a unique location in the subsurface region.

13. The data processing system of claim 10, wherein determining the respective weight values comprises:
setting a same weight value for each depth map of the plurality.

14. The data processing system of claim 10, wherein determining the respective weight values comprises:
selecting different weight values for at least two respective depth maps of the plurality.

15. The data processing system of claim 10, wherein determining the respective weight values comprises:
determining a value of a data quality metric of a seismic survey, interpretation, or velocity model that is used for generating a depth map of the plurality of depth maps; and
selecting a weight value based on the value of the data quality metric.

16. The data processing system of claim 10, wherein determining the respective weight values comprises:
training a machine learning model using data representing one or more labeled depth maps;
inputting the data representing a plurality of depth maps into the trained machine learning model; and
generating, by the trained machine learning model, a weight value for one or more of the depth maps.

17. The data processing system of claim 10, wherein generating data representing a combination of the plurality of depth maps comprises generating data including at least one of a mean, a standard deviation, or a statistical property of the plurality of depth maps.

18. The data processing system of claim 10, wherein the probability value representing the depth at which the geological layer occurs in the subsurface region at the particular location corresponds to an oil-water contact, a gas-oil contact, a gas-water contact, a $CO_2$-water contact, or a halocline.

19. A method performed by a data processing system configured to generate probabilistic data for planning a well depth for subsurface exploration, the method comprising:
receiving data representing a plurality of depth maps for a subsurface region, each depth map of the plurality of depth maps being generated from seismic data acquired in a seismic survey at a location in the subsurface region;
determining, for one or more depth maps of the plurality, a respective weight value;
generating data representing a combination of the plurality of depth maps based on the respective weight values of the one or more depth maps of the plurality;
generating a cumulative distribution function (CDF) for a particular location in the subsurface region based on the data representing a combination of the plurality of depth maps; and
determining, for the particular location in the subsurface region based on the CDF for that particular location, a probability value representing a depth at which a geological layer occurs in the subsurface region at the particular location.

20. The method of claim 19, wherein the probability value representing the depth at which the geological layer occurs in the subsurface region at the particular location corresponds to an oil-water contact, a gas-oil contact, a gas-water contact, a CO2-water contact, or a halocline.

* * * * *